(No Model.)

J. H. WALKER.
Picture Hook.

No. 238,621.  Patented March 8, 1881.

Witnesses
H. N. Gale,
Henry H. Evarts

Inventor:
John H. Walker,
per Chas. G. Root, atty

UNITED STATES PATENT OFFICE.

JOHN H. WALKER, OF WATERBURY, CONNECTICUT.

PICTURE-HOOK.

SPECIFICATION forming part of Letters Patent No. 238,621, dated March 8, 1881.

Application filed December 28, 1880. (No model.)

*To all whom it may concern:*

Be it known that I, JOHN H. WALKER, of Waterbury, Connecticut, have invented a new and useful Improvement in Picture-Hooks, of which the following is a specification.

My invention consists of a hook made of wrought or cast metal, turned up at the lower end to form a hook, and having a nail-hole or screw-hole and a slot in the other end. I also provide a cover or cap, which fits on the body or shank of the hook and conceals the head of the screw or nail.

Figure 1:
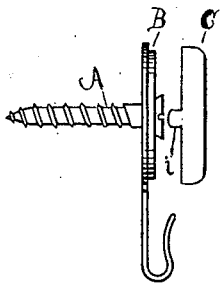
Figure 2:
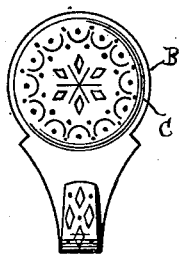
Figure 3:
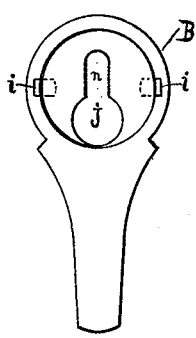

In the accompanying drawings, Figure 1 is a side elevation of my improved picture-hook with the cap or cover detached, and showing a screw in the slot in the shank of the hook. Fig. 2 is a front elevation of my hook with the cover or cap in place. Fig. 3 is a rear elevation of the hook, showing the hole and slot.

The hook B is one strip or piece of wrought or cast metal, having one end turned up to form the hook, and having in the other end or shank the hole J and slot $n$.

C is the cover or cap, which may be made of any pattern, and fits on the shank of the hook, and covers the head of the screw or nail. It is provided with the projections or tongues $i$ $i$, which enter slots in the shank of the hook, and are bent down and hold the cover or cap in place. This cover or cap may be attached to the hook in this way, or by soldering, or in a variety of other ways.

In securing my hook to the wall the nail or screw A is first secured to the wall, and then the hook, with the cover or cap B attached to its shank, is slipped onto the screw or nail, the head of the screw or nail passing through the hole J, and the hook, slipping down by means of the slot $n$ onto the shank of the screw or nail, is held firmly in its place.

If a simple nail-hole or screw-hole were used in the shank or body of the hook in place of the hole J and slot $n$, it would be necessary to pass the screw or nail through the hole in the hook before it was secured to the wall, and it would be impossible to affix the cover or cap before the hook was secured to the wall. In my invention, however, the nail or screw is first secured to the wall, and then the hook all complete, with the cover or cap attached, is slipped on, and by means of the slot $n$ falls into place.

I am aware that prior to my invention movable covers or caps have been used over the heads of nails and screws. I do not claim this; but What I do claim as my invention, and desire to secure by Letters Patent, is—

The picture-hook described, consisting of a piece of wrought or cast metal, B, with its lower end turned up to form a hook, and having a hole, J, and slot $n$ in the other end, together with the cap C permanently attached to the shank or body of the hook, substantially as shown and described.

JOHN H. WALKER.

Witnesses:
HENRY B. EVARTS,
JOHN WILLIAMS.